No. 728,038.

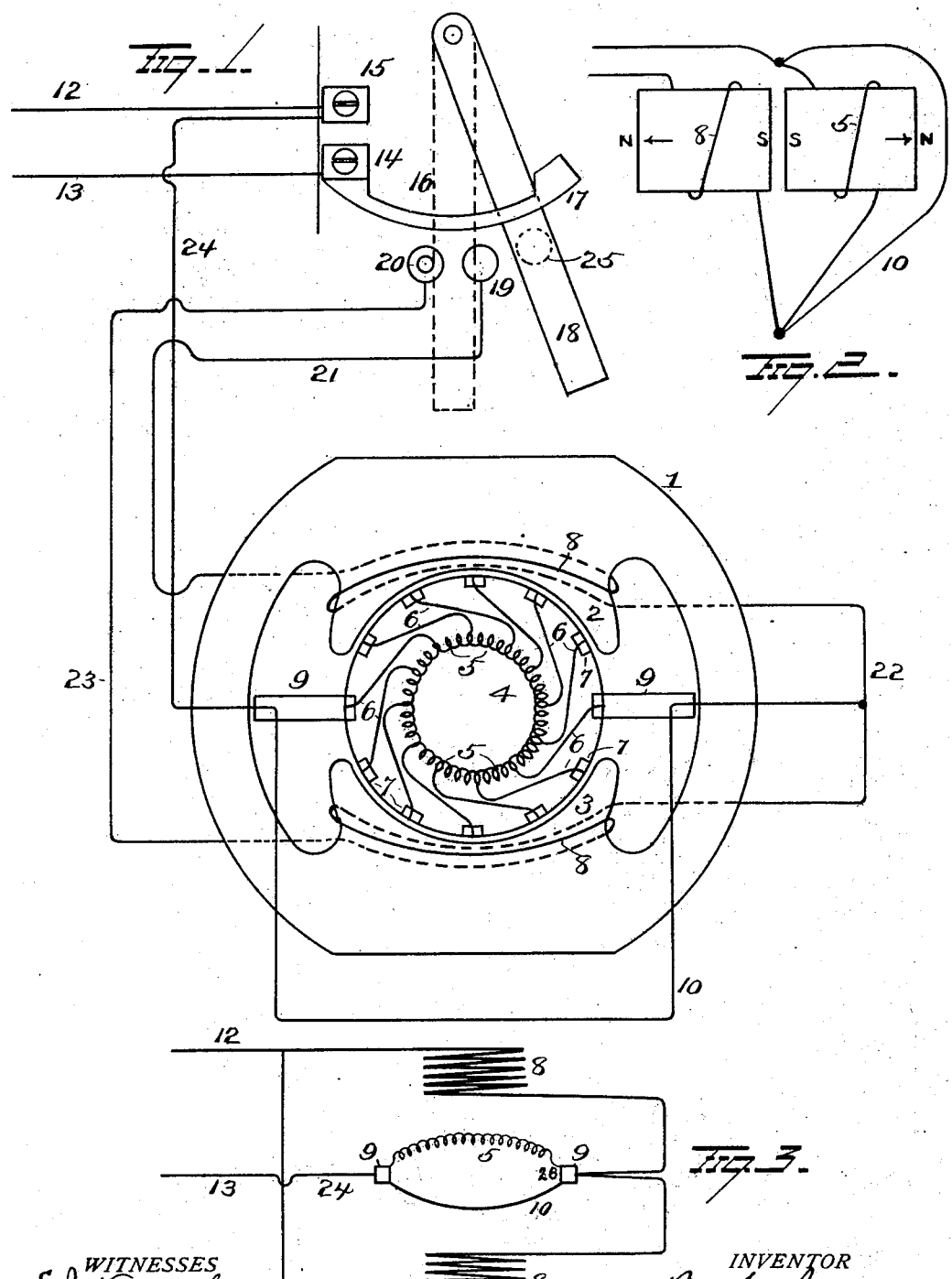

Patented May 12, 1903.

UNITED STATES PATENT OFFICE.

BERNARD A. STOWE, OF CLEVELAND, OHIO, ASSIGNOR TO THE JANDUS ELECTRIC COMPANY, OF CLEVELAND, OHIO.

ALTERNATING-CURRENT ELECTRIC MOTOR.

SPECIFICATION forming part of Letters Patent No. 728,038, dated May 12, 1903.

Application filed July 12, 1902. Serial No. 115,353. (No model.)

*To all whom it may concern:*

Be it known that I, BERNARD A. STOWE, of Cleveland, in the county of Cuyahoga and State of Ohio, have invented certain new and useful Improvements in Alternating-Current Electric Motors; and I do hereby declare the following to be a full, clear, and exact description of the invention, such as will enable others skilled in the art to which it appertains to make and use the same.

My invention relates to improvements in electric motors adapted for operation with alternating currents, and more particularly to that class of such motors known in the art as "alternating-current motors of the direct-current type."

Heretofore much annoyance has been occasioned with motors of the class to which my invention relates on account of the deterioration of the commutator and its brushes, due to excessive sparking, thus rendering such motors as heretofore constructed impractical for many purposes—such, for instance, as to operate fans. Furthermore, as is well known, the single-phase induction-motor has a very low torque, which fact precludes its use for starting trains. With multiphase induction-motor, while its starting torque is quite satisfactory, a complex transmission-line and the use of two or more trolleys or current-collecting devices is necessary.

One object of my invention is therefore to produce a motor for use with alternating currents by means of which trains may be operated from a high-voltage transmission-line, the voltage being transformed at convenient intervals to lower pressures—say six hundred volts—at which voltage it enters the trolley and finally the motor, whereby a satisfactory starting torque will be obtained from an alternating-current supply and without the necessity for the use of rotary converters and direct-current motors.

A further object is to render alternating-current motors of the direct-current type valuable for practical purposes by eliminating or at least reducing to a very limited degree the sparking at the commutator-brushes.

With these objects in view the invention consists in a translating device to be actuated by alternating electric currents comprising two coils or helices connected in series and disposed in inductive relation to each other and a low-resistance conductor shunting one of said coils.

The invention further consists in a translating device to be actuated by alternating electric current comprising fundamentally two coils or helices disposed in inductive relation to each other, said coils or helices connected in series in such way that the currents flowing therein shall be in opposite directions and a low-resistance conductor shunting one of the coils.

My invention further consists in an alternating-current motor of the direct-current type having its commutator-brushes connected together by a conductor of low resistance.

My invention also consists in an alternating-current motor of the direct-current type having its commutator-brushes short-circuited by a constantly-closed conductor of low resistance.

My invention further consists in an alternating-current motor comprising a stator and a rotor in circuit with each other and a constantly-closed circuit of low resistance around the commutator-brushes.

My invention further consists in an alternating-current motor comprising a stator and a rotor, a line-circuit including both, and a constantly-closed low-resistance circuit around the coils of the rotor.

My invention further consists in certain novel features and combinations and arrangements of parts and circuits, as hereinafter set forth, and pointed out in the claims.

In the accompanying drawings, Figure 1 is a view illustrating diagrammatically an embodiment of my invention. Fig. 2 is a diagram illustrating the relative arrangements of circuits in the stator and rotor. Fig. 3 is a diagram showing the stator-coils, one rotor-coil, and the low-resistance circuit.

1 represents the stator-frame, having two diametrically opposite pole-pieces 2 3, and this frame, with its integral pole-pieces, is composed of numerous iron laminations, as is usual in the construction of motors intended for operation by alternating electric currents. If desired, the stator may be made multipolar instead of bipolar.

The rotary member or rotor 4 may be of the drum type, and its core comprises a number of iron laminations, as usual, having slots for the accommodation of the rotor-coils 5. The terminals 6 of the coils are connected with the commutator-segments 7, out of line with or laterally removed from the axis of the coils, or, as is well known, instead of connecting the rotor-coils with the commutator-segments in the manner above explained they may be connected with the commutator-segments in line with their axes and the desired lead of the coils accomplished by shifting the lead of the brushes.

The stator-coils 8 are shown in the drawings as arranged in parallel, having one terminal of each connected with one of the commutator-brushes 9 and the other terminals connected with one of the line-terminals, while the other commutator-brush is connected with the other line-terminal.

The motor to which my invention relates is of the "repulsion" type, the current being made to traverse the stator and rotor in such direction that poles of the same sign of the stator and rotor will be brought into repulsive relation to each other. The arrangement of windings of the stator and rotor coils which may be employed is clearly illustrated in Fig. 2.

By connecting the stator-coils in parallel and including the rotor-windings in circuit with the stator-windings ready means will be afforded for changing the speed of the motor, a switch 11 being employed for connecting the stator-coils in parallel when a maximum speed is desired and for cutting out one of the stator-coils and using the other alone in series with the rotor when a slower speed is desired.

The arrangement of circuits above alluded to is fully illustrated in Fig. 1 of the drawings. In this figure the leading-in wires 12 13 are shown connected with the binding-posts 14 15 of the switch 16. This switch comprises a segment 17, integral with the binding-post 14, a pivoted arm 18, making electrical contact with the segment 17, and contact-posts 19 20. The contact-post 19 is connected by a wire 21 with one end of one of the stator-coils, and the other end of this coil is connected by a conductor 22 with one end of the other stator-coil, the other end of the latter being in turn connected with the contact-post 20 by a wire 23. The wire 22 is connected with one of the commutator-brushes, and the other commutator-brush is connected, by means of conductor 24, with the binding-post 15. From this arrangement of circuits it will be seen that when the switch-arm 18 is on the idle post 25 the motor will be open-circuited and at rest. In starting the motor, when the switch-arm is moved to the contact-post 19 the circuit can be readily traced through one of the stator-coils and the rotor-coils in series. When the switch-arm is moved farther, so as to bridge the contact-posts 19 20, the two stator-coils will be arranged in parallel with each other and the rotor in series, as before, when the speed of the motor will be increased. In order to obtain a slower speed than is had when the single stator-coil is in circuit, the two stator-coils may be arranged in series with each other and with the rotor.

The motor constructed as above described has when used on an alternating-current circuit been found to start positively; but the sparking at the brushes is excessive, and, in fact, this is the serious defect which has precluded general use on the market of alternating-current motors of the direct-current type. The reduction of the sparking at the brushes in such a motor constitutes a very important feature of my invention. This result I accomplish by providing a low-resistance circuit 10 around the brushes. At first thought it might seem that this low-resistance path would short-circuit the rotor, so that practically the entire current would flow through this low-resistance path, and so it would if a direct current were employed; but such is not the case when the motor is operated by an alternating current. I have found in actual tests with an ammeter placed in the circuit 10 that a current equal to approximately fifty per cent. of the total line-current flows through this circuit. Other tests have demonstrated that the amount of current flowing in conductor 10 or bridge-wire depends upon the relative strengths and position of the stator and rotor fluxes. It may be possible to obtain a zero value of current flowing in the bridge-wire under proper conditions. The reason for this phenomenon is believed to be as follows: For convenience of explanation we will consider one-half "period" or semicycle of an alternating current— that is to say, a current impulse represented by a single curve from the minimum or "time" line to maximum and back to the minimum or time line.

Let it be considered that the commutator-brushes are connecting the ends of the rotor-coil shown in Fig. 3, that said coil is passing through the lines of force of the field, and that one-half period of the line-current is entering at 26. Under these conditions a current is induced in the rotor-coil which is in the reverse direction to that of the line-current in the stator-coil. This induced current will take the path of least resistance, and hence flow from one end of the coil through the low-resistance path 10 to the other end of the coil, the coil being thus closed on itself through the low-resistance circuit 10.

For the sake of clearness in the following paragraphs and believing that reference to "current-flow" in conductors will afford greater ease in understanding the peculiarities of the motor I will adopt this term rather than electromotive force, which gives rise to the current. In the first place I would consider the motor as a transformer, the stator coil or coils constituting the primary and the rotor-coil the secondary. In order that the motor shall operate as a transformer and for the purpose of studying the reactions therein, I will disconnect the line-circuit from the brushes and short-circuit the latter with a bridge-wire of low resistance. I will, furthermore, prevent rotation of the rotor. Under these conditions I have a static or stationary transformer with a short-circuited secondary. This condition is analogous to a full non-inductive load on a transformer. The primary coil is energized by an alternating current, which through the medium of the alternating flux induces in the secondary or rotor coil a current which is practically one hundred and eighty degrees behind the primary current. With the secondary circuit open the secondary electromotive force is exactly one hundred and eighty degrees behind the impressed electromotive force. As the secondary is loaded up with a non-inductive load, the phase of the secondary electromotive force lags somewhat farther behind. The primary current lags behind the impressed electromotive force, but approaches the phase of the impressed electromotive force as the secondary is loaded up with a non-inductive load. Likewise, the secondary current lags behind the induced electromotive force, so that the secondary current is practically one hundred and eighty degrees behind the primary current.

It has been found that when the primary coil in a small motor is energized under the conditions above stated the induced current traversing the short-circuit wire amounts to 1.15 amperes. I now release the rotor and note that a speed of sixteen hundred and ninety revolutions per minute makes no appreciable difference in the current flowing in the bridge-wire. I now connect the prime circuit to the brushes, leaving the bridge-wire as before and securing the rotor. Note that the bridge-current is now only .28 amperes. The prime current is 1.05 amperes. Owing to the above connections and the relative direction of prime and induced currents in the rotor, I have two currents of a phase difference of practically one hundred and eighty degrees, and therefore opposing each other attempting to pass through the bridge-wire, one an induced current of 1.15 amperes and the other a current of approximately 1.05 amperes. As above stated, the induced current in the rotor, whose circuit is completed through the bridge-wire, is practically one hundred and eighty degrees behind the phase of the prime current, which is attempting to pass through the bridge in preference to the rotor-coils. If the phases of these two currents were exactly one hundred and eighty degrees apart, the resulting bridge-current would be the difference between the intensities of the two and in phase with the greater. Assuming such as the case, the resulting current in the bridge would be 1.15, 1.05, or .10 amperes. I find, however, that the current is really .28 amperes and assign this difference to a displacement of phase. Remembering that the rotor is at rest, we have no counter electromotive force with which to contend in the rotor-coil.

As above stated, the bridge-current when the prime circuit is disconnected and the rotor is at rest is 1.15 amperes. Now when the prime circuit is connected, the bridge-circuit open, and the rotor at rest we observe a current of 1.15 amperes flowing through the prime, and therefore through the rotor circuit. When the rotor is released, the prime current is decreased to about .90 amperes, which reduction is accounted for in the counter electromotive force set up in the rotor-coil due to its rotation.

With the above experimental data before me I arrive at the following conclusions: that the .28 amperes flow in the bridge-circuit when both prime and induced currents are contending and the rotor is at rest is the excess of prime over the induced current and that when the rotor is released the increased current in the bridge, or about .52 amperes, obtains, owing to the counter electromotive force of rotation of the rotor, which opposes the flow of prime current through the rotor-coil, and consequently augments the prime current in the bridge-circuit. The counter-electromotive-force current is completed through the bridge the same as the induced current, but in the opposite direction, the said induced current being so directed through the rotor-coils that it shall be unidirectional with the prime or line current.

When the motor is operated without the bridge-circuit, the sparking at the brushes is considerable, which militates against its use commercially. It is found, however, that this excessive sparking is reduced to a minimum the moment the bridge-circuit is introduced. With a direct-current motor a bridge-circuit as applied to the alternating-current motor when the direct-current motor is in operation would immediately choke the rotation to zero, inasmuch as it affords a low-resistance path for the counter-electromotive-force current generated by the rotation of the armature-coils in the field. In my alternating-current motor this counter-electromotive-force current does not attain such a value as to bring the rotor to a state of rest, owing to the electromotive force of induction, which opposes the counter electromotive force of revolution. The latter, however, is sufficient to check the sparking that obtains when the bridge-circuit is open.

I have found also that the introduction of the bridge-circuit does not appreciably decrease the efficiency of the motor.

My improvements are efficient for electric railroad and power purposes, for electric fans, and also for measuring instruments.

Having fully described my invention, what I claim as new, and desire to secure by Letters Patent, is—

1. A translating device adapted to be actuated by alternating currents, comprising two coils or helices connected in series and disposed in inductive relation to each other, and a constantly-closed circuit of low resistance connecting the terminals of one of said coils or helices.

2. A translating device adapted to be actuated by alternating current, comprising fundamentally, two coils or helices, disposed in inductive relation to each other, said coils or helices connected in series in such way that the currents flowing therein shall be in opposite directions, and a low-resistance conductor shunting one of the coils.

3. An alternating-current motor comprising a stator, a rotor, a commutator for the rotor, and commutator-brushes in series with each other, and a constantly-closed circuit of low resistance around the said commutator-brushes.

4. An alternating-current motor comprising a stator and a rotor, a line-circuit including both and a constantly-closed low-resistance circuit bridging the rotor-terminals.

5. An alternating-current motor of the direct-current type having its stator-coils connected in parallel and its rotor-coils and commutator-brushes connected in series with the stator-coils, and a low-resistance short circuit connecting the said commutator-brushes.

6. An alternating-current motor of the direct-current type, comprising a stator having its coils connected in parallel, a rotor having its coils connected in circuit with the stator-coils, a switch for closing the circuit through one or both of the stator-coils, a commutator, and a low-resistance short circuit connecting the brushes of the commutator.

7. In an alternating-current motor of the direct-current type, the combination with the stator, of a rotor having its coils connected together, a commutator having its segments connected with the respective coils of the rotor, commutator-brushes, a line-circuit including the stator and rotor coils and said commutator-brushes, and a low-resistance conductor connecting the commutator-brushes.

8. An alternating-current motor of the direct-current type, comprising a stator and a rotor in series with each other, means for effecting the lead of the rotor-coils relatively to the field of force of the stator, and a low-resistance short circuit around the rotor.

9. An alternating-current motor of the direct-current type having its commutator-brushes connected by a conductor of low resistance, independently of the commutator-segments.

10. An alternating-current motor comprising a stator, a rotor, a commutator for the rotor, a line-circuit including said stator and rotor, and a constantly-closed circuit of low resistance around the rotor-terminals independently of the commutator.

In testimony whereof I have signed this specification in the presence of two subscribing witnesses.

BERNARD A. STOWE.

Witnesses:
J. POTTER,
C. R. MEGERTH.